(12) United States Patent
Kano et al.

(10) Patent No.: US 8,921,455 B2
(45) Date of Patent: Dec. 30, 2014

(54) ANTI-FOG COATING COMPOSITION

(75) Inventors: Takamitsu Kano, Aichi-ken (JP); Shinji Mashiko, Aichi-ken (JP); Takuro Makiguchi, Aichi-ken (JP); Michihisa Yamada, Aichi-ken (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 13/514,871

(22) PCT Filed: Dec. 21, 2010

(86) PCT No.: PCT/JP2010/073020
§ 371 (c)(1),
(2), (4) Date: Jun. 8, 2012

(87) PCT Pub. No.: WO2011/083686
PCT Pub. Date: Jul. 14, 2011

(65) Prior Publication Data
US 2012/0245250 A1 Sep. 27, 2012

(30) Foreign Application Priority Data
Jan. 8, 2010 (JP) .................................. 2010-002817

(51) Int. Cl.
C09K 3/18 (2006.01)
C09D 133/24 (2006.01)
C08F 220/14 (2006.01)
C08F 220/58 (2006.01)
C09D 133/06 (2006.01)
C09D 133/14 (2006.01)

(52) U.S. Cl.
CPC ............ *C09D 133/24* (2013.01); *C08F 220/14* (2013.01); *C08F 220/58* (2013.01); *C09D 133/06* (2013.01); *C09D 133/14* (2013.01)
USPC .......................................................... 523/169

(58) Field of Classification Search
USPC ........................................................ 523/169
See application file for complete search history.

(56) References Cited

FOREIGN PATENT DOCUMENTS

| JP | 51-125112 A | | 11/1976 |
|---|---|---|---|
| JP | 02-219873 A | | 9/1990 |
| JP | 3-221566 A | | 9/1991 |
| JP | 03-223370 A | | 10/1991 |
| JP | 6-107967 A | | 4/1994 |
| JP | 6-212146 A | | 8/1994 |
| JP | 08188682 A | * | 7/1996 |
| JP | 8-269387 A | | 10/1996 |
| JP | 11-228940 A | | 8/1999 |
| JP | 2006-28335 A | | 2/2006 |
| JP | 2007-51254 A | | 3/2007 |

OTHER PUBLICATIONS

Machine Translation of JP 2006-028335.*
Machine translation of JP H08-188682.*
Machine Translation of JP H06-107967.*
International Preliminary Report on Patentability issued in International Application No. PCT/JP2010/073020 dated Aug. 7, 2012.
European Search Report dated Nov. 12, 2013 issued in Application No. 10842199.1-1304.

* cited by examiner

*Primary Examiner* — Nicole M Buie-Hatcher
*Assistant Examiner* — Chelsea M Lowe
(74) *Attorney, Agent, or Firm* — Sughrue Mion, PLLC

(57) ABSTRACT

Provided is an anti-fog coating composition that rarely suffers from blushing when applied and dried even under high-humidity conditions and that can be heat-cured even at low temperature in a short time and form a coating film that exhibits excellent tight adhesion to a substrate and excellent heat resistance and anti-fog properties. The anti-fog coating composition comprises (A) a copolymer prepared from a monomer mixture of a monomer (A1), a monomer (A2) and a monomer (A3); (B) a basic compound such as amines; and (C) a surfactant such as anionic surfactants. The monomer (A1) is a vinyl monomer that has an N-methylol group or an N-alkoxymethylol group. The monomer (A2) is a vinyl monomer that has a sulfonic acid group. The monomer (A3) is an alkyl(meth)acrylate monomer.

3 Claims, No Drawings

ANTI-FOG COATING COMPOSITION

CROSS REFERENCE TO RELATED APPLICATIONS

This application is a National Stage of International Application No. PCT/JP2010/073020, filed on Dec. 21, 2010, which claims priority from Japanese Patent Application No. 2010-002817, filed on Jan. 8, 2010, the contents of all of which are incorporated herein by reference in their entirety.

TECHNICAL FIELD

The present invention relates to an anti-fog coating composition that is formed on a substrate such as an automobile headlamp, that does not suffer from blushing and other problems even when applied and dried under high-humidity conditions, and that can be heat-cured in a short time and at a low temperature to form a coating film with tight adhesion to the substrate and excellent heat resistance and anti-fog properties.

BACKGROUND ART

In automobile headlamps and other vehicular lighting fixtures, fog occurs when high-humidity air enters the light chamber, the lens is cooled by outside air, rainfall or the like, and moisture condenses on the inner surface. This reduces the brightness of the vehicular lamp, and can also make the lens less attractive, causing user dissatisfaction. Anti-fog coatings that are coated on the areas where fog occurs are known as a means of preventing such fogging of the lens.

The applicants in this case have already proposed a heat-cured anti-fog coating composition such as the following (see Patent Document 1). This heat-cured anti-fog coating composition contains a monomer having a cross-linkable functional group that is either a N-methylol group, a N-methylol ether group or a hydroxyl group, and a block or graft copolymer consisting of a hydrophilic polymer part formed from a hydrophilic monomer and a lower alkyl(meth)acrylate and a hydrophobic polymer part formed from a vinyl monomer having a sulfonic acid, carboxyl or phosphoric acid group and a lower alkyl(meth)acrylate. With this anti-fog coating composition, it is possible to form a coating film whereby excellent anti-fog properties and adhesiveness are maintained in high-temperature environments.

Patent Document 1: Japanese Patent Application Laid-open No. H6-212146 (page 2, page 3, pages 14 to 17)

SUMMARY OF INVENTION

However, with the anti-fog coating composition of Patent Document 1 a long curing time of 60 minutes is required to heat-cure the coating film at a low temperature of 80° C. Another problem is blushing attributable to the hydrophobic polymer part of the copolymer, which occurs if the relative humidity (RH) of the environment exceeds 60% when the anti-fog coating composition is applied, and often causes whitening of the coated film. Blushing is a phenomenon that occurs when the humidity is high (such as RH 60% or more) when a coating material is applied and dried, in which fine particles of moisture in the air condense on the surface of the coating film during application and drying, and the resin components aggregate and precipitate, resulting in bumps and indentations on the surface of the coating film that cause the coating film to appear white.

It is an object of the present invention to provide an anti-fog coating composition whereby blushing is suppressed even when a coating material is applied and dried under high-humidity conditions, and which can be heat-cured in a short time and at a low temperature to obtain a coating film with tight adhesion to a substrate and excellent heat resistance and anti-fog properties.

To achieve this object, the anti-fog coating composition of one aspect of the present invention contains a copolymer (A) formed from a monomer mixture containing a monomer (A1), a monomer (A2) and a monomer (A3); a basic compound (B); and a surfactant (C). The monomer (A1) is vinyl monomer having N-methylol group or N-alkoxymethylol group. The monomer (A2) is vinyl monomer having sulfonic acid group. The monomer (A3) is alkyl(meth)acrylate monomer.

Preferably, the content of the monomer (A1) is 3 to 20 parts by mass, the content of the monomer (A2) is 3 to 20 parts by mass, the content of the monomer (A3) is 60 to 94 parts by mass, and the total of the monomers (A1) and (A2) is 6 to 40 parts by mass per 100 parts by mass as the total of the monomers (A1), (A2) and (A3), while the content of the basic compound (B) is 50 to 90 mol % of the sulfonic acid group in the monomer (A2), and the content of the surfactant (C) is 0.5 to 30 parts by mass per 100 parts by mass of the copolymer (A).

Preferably, the monomer mixture further contains a N,N-dialkyl(meth)acrylamide monomer (A4), the content of the monomer (A4) being 5 to 50 parts by mass per 100 parts by mass as the combined content of the monomers (A3) and (A4).

The base dissociation constant of the basic compound (B) in an aqueous solution at 25° C. is preferably 3 to 14.

The boiling point of the basic compound (B) is preferably 130 to 1500° C.

In one example, the copolymer (A) has crosslinked structures formed by a condensation reaction of N-methylol group or N-alkoxymethylol group of the monomer (A1), and the monomer (A2) has neutralized sulfonic acid group that improves the hydrophilicity and heat resistance of the copolymer (A) and non-neutralized sulfonic acid group that promotes the condensation reaction of the monomer (A1).

The following effects can be achieved with the present invention.

With the anti-fog coating composition of the first invention, good curing properties are achieved based on the properties of the monomer (A1), while accelerated curing at low temperatures and blushing suppression are achieved based on the properties of the monomer (A2), and good heat resistance and adhesiveness with the substrate are achieved based on the properties of the monomer (A3) forming the copolymer. Moreover, neutralizing some of the sulfonic acid groups of the monomer (A2) based on the properties of the basic compound (B) serves to increase the hydrophilicity of the copolymer while also enhancing the blushing suppression effect and providing excellent heat resistance by suppressing oxidation degradation of the coating film caused by sulfonic acid groups under high temperature conditions. Additionally, good anti-fog properties are achieved by the surfactant effect of the surfactant (C), which reduces the surface tension of the moisture adhering to the coating film surface so that it forms a water film.

Thus, with the anti-fog coating composition blushing is suppressed even when the coating material is applied and dried under high-humidity conditions, and heat-curing can be achieved in a short time and at a low temperature to obtain a coating film with tight adhesion to a substrate and excellent heat resistance and anti-fog properties.

BEST MODE FOR CARRYING OUT THE INVENTION

Detailed embodiments of the present invention are explained in detail below.

<Anti-Fog Coating Composition>

The anti-fog coating composition of this embodiment contains a copolymer (A) formed from a monomer mixture containing a monomer (A1), a monomer (A2) and a monomer (A3); a basic compound (B); and a surfactant (C). The monomer (A1) is vinyl monomer having N-methylol group ($-NHCH_2OH$) or N-alkoxymethylol group ($-NHCH_2OR$, where R is alkyl group). The monomer (A2) is vinyl monomer having sulfonic acid group (sulfo group, $-SO_3H$). The monomer (A3) is alkyl(meth)acrylate monomer.

This anti-fog coating composition can be used favorable as an anti-fog coating material for headlamps and other vehicular lighting fixtures for example. This anti-fog coating composition does not suffer from blushing and other problems when applied and dried under high-humidity conditions, and can be heat-cured in a short time and at a low temperature. A coating film obtained by heat-curing the anti-fog coating composition has tight adhesion to a substrate (object to be coated), and excellent heat resistance and anti-fog properties.

The components of the anti-fog coating composition are sequentially explained order below.

[Copolymer (A)]

[Monomer (A1)]

The monomer (A1) forming the copolymer, or in other words a vinyl monomer having N-methylol or N-alkoxymethylol group, is explained first. This monomer (A1) is a vinyl monomer for forming crosslinked structures in the copolymer by intermolecular crosslinking in a dehydration condensation reaction, dealcoholization condensation reaction or other condensation reaction. Because the monomer (A1) has such cross-linkable functional groups, crosslinked structures are formed in the copolymer when it is heated after manufacture. This condensation reaction is promoted by an acid catalyst.

Examples of the monomer (A1) include N-methylol(meth)acrylamide, N-methoxymethylol(meth)acrylamide and N-butoxymethylol(meth)acrylamide for example. One or two or more of these can be used as the monomer (A1). Of these monomers, N-methylol(meth)acrylamide is particularly desirable as the monomer (A1) from the standpoint of excellent storage stability of the anti-fog coating composition and excellent heat-curing properties at low temperatures.

The content of the monomer (A1) is 3 to 20 parts by mass or preferably 5 to 15 parts by mass per 100 parts by mass as the total of the monomers (A1), (A2) and (A3). If the content of the monomer (A1) is less than 3 parts by mass, the low-temperature curing properties of the copolymer are reduced, and the curing time is prolonged. If the content of the monomer (A1) exceeds 20 parts by mass, on the other hand, the crosslinking density of the copolymer is increased, reducing the anti-fog properties of the coating film, and the crosslinking reaction may progress over time if the film is left under high-temperature conditions, further reducing the anti-fog properties of the film.

[Monomer (A2)]

The monomer (A2), or in other words a vinyl monomer having sulfonic acid group, is explained next. This monomer (A2) functions as an acid catalyst to promote the condensation reaction of the monomer (A1) at low temperatures, and also serves to give the coating film a good external appearance by increasing the hydrophilicity of the copolymer and suppressing blushing when the composition is applied and dried under high humidity conditions.

Examples of the monomer (A2) include 3-sulfopropyl (meth)acrylate, 2-sulfoethyl(meth)acrylate, 2-acrylamido-2-methylpropanesulfonic acid, p-styrenesulfonic acid, vinylsulfonic acid and methallylsulfonic acid for example. One or two or more of these can be used as the monomer (A2).

Of these monomers, 3-sulfopropyl(meth)acrylate, 2-sulfoethyl(meth)acrylate and 2-acrylamido-2-methylpropanesulfonic acid are particularly desirable as the monomer (A2) from the standpoint of excellent copolymerizability with the monomer (A1).

The content of the monomer (A2) is preferably 3 to 20 parts by mass or more preferably 5 to 15 parts by mass per 100 parts by mass as the total of the monomers (A1), (A2) and (A3). If the content of the monomer (A2) is less than 3 parts by mass, it does not function sufficiently as an acid catalyst in the condensation reaction of the monomer (A1), so that the low-temperature curing properties of the copolymer are reduced and the curing time tends to be longer. The copolymer also becomes insufficiently hydrophilic, and there is a risk of blushing when the composition is applied and dried under high humidity conditions. On the other hand, if the content of the monomer (A2) exceeds 20 parts by mass the polarity of the copolymer (A) is much higher, and the adhesiveness of the coating film tends to be less because affinity between the coating film and the substrate reduced, while at the same time the heat resistance of the coating film tends to be less because there is an increased risk of oxidation degradation of the coating film caused by sulfonic acid groups of the monomer (A2) under high-temperature conditions.

[Monomer (A3)]

The monomer (A3), which is an alkyl(meth)acrylate monomer, is explained next. This monomer (A3) is a component that enhances the heat resistance of the coating film and confers good adhesiveness by increasing the affinity between the coating film and the substrate. Alkyl(meth)acrylate monomers are linear, branched or cyclic alkyl esters of (meth)acrylic acid.

Examples of this monomer (A3) include methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, 2-ethylhexyl(meth)acrylate, lauryl(meth)acrylate, stearyl(meth)acrylate and cyclohexyl (meth)acrylate. One or two or more of these may be used as the monomer (A3).

A lower alkyl(meth)acrylate monomer is preferred as monomer (A3). The lower alkyl(meth)acrylate monomers are those alkyl(meth)acrylate monomers in which the number of carbon atoms in the alkyl group of the alkyl ester is 1 to 4. A lower alkyl(meth)acrylate in which the alkyl group of the alkyl ester has 1 or 2 carbon atoms is preferred as monomer (A3). When using an alkyl(meth)acrylate in which the alkyl group of the alkyl ester has 5 or more carbon atoms, the hydrophilicity of the copolymer is reduced, and there is an increased risk of blushing when the composition is applied and dried under conditions of high humidity.

The content of the monomer (A3) is preferably 60 to 94 parts by mass or more preferably 70 to 90 parts by mass per 100 parts by mass as the total of the monomers (A1), (A2) and (A3). If the content of the monomer (A3) is less than 60 parts by mass, adhesiveness between the coating film and the substrate is reduced due to the increased proportions of the monomers (A1) and (A2). If the content of the monomer (A3) exceeds 94 parts by mass, on the other hand, the low-temperature curing properties of the copolymer are less due to the decreased proportions of monomers (A1) and (A2), and the curing time tends to be longer.

[Other Vinyl Monomer]

Another vinyl monomer can be used as a monomer for forming the copolymer in addition to the monomer (A1), monomer (A2) and monomer (A3). This other vinyl monomer is not particularly limited as long as it can be copolymerized with the monomers (A1) to (A3).

Specific examples of the other vinyl monomer include styrene, vinyl toluene, α-methylstyrene and other aromatic vinyl monomers; (methoxy)polyethylene glycol mono(meth)acrylate, (methoxy)polypropylene glycol mono(meth)acrylate, (ethoxy)polyethylene glycol mono(meth)acrylate, (ethoxy)polypropylene glycol mono(meth)acrylate and other alkoxy alkylene glycol(meth)acrylate monomers; 2-hydroxyethyl(meth)acrylate, 2-hydroxypropyl(meth)acrylate, 4-hydroxybutyl(meth)acrylate, 2-hydroxyethyl(meth)acrylate ε-caprolactone adduct and other hydroxyl group-containing vinyl monomers; (meth)acrylic acid, crotonic acid, maleic acid, maleic acid half ester and other carboxyl group-containing monomers and their alkali metal salts and ammonium salts; and (meth)acrylamide, N-methyl(meth)acrylamide, N,N-dimethyl(meth)acrylamide, N-ethyl(meth)acrylamide, N,N-diethyl(meth)acrylamide, N-n-propyl(meth)acrylamide, N-isopropyl(meth)acrylamide, N-dimethylaminoethyl(meth)acrylamide, N-dimethyl aminopropyl(meth)acrylamide, diacetone(meth)acrylamide, N-(meth)acryloyl piperidine, (meth)acryloyl morpholine, N-vinyl-2-pyrrolidone, 2-vinyl pyridine and other nitrogen atom-containing vinyl monomers and the like. One or two or more of these can be used as the other vinyl monomer.

[Monomer (A4)]

Of these other vinyl monomers, N,N-dimethyl(meth)acrylamide, N,N-diethyl(meth)acrylamide or another N,N-dialkyl(meth)acrylamide monomer (sometimes abbreviated as monomer (A4)) is preferred from the standpoint of superior heat resistance, high hydrophilicity, and good blushing suppression effects. One or two or more monomers (A4) may be used. The content of the monomer (A4) is preferably 5 to 50 parts by mass per 100 parts by mass as the total of the monomers (A3) and (A4).

From the standpoint of excellent heat resistance and adhesiveness to the substrate and also for improving hydrophilicity of the copolymer and suppressing blushing, it is especially desirable to use a combination of a lower alkyl(meth)acrylate monomer (A3) and a N,N-dialkyl acrylamide monomer (A4).

When a lower alkyl(meth)acrylate monomer is used in combination with a N,N-dialkyl(meth)acrylamide monomer, the content of the lower alkyl(meth)acrylate monomer (A3) is preferably 50 to 90 parts by mass while the content of the N,N-dialkyl(meth)acrylamide monomer (A4) is such as to constitute the remainder per 100 parts by mass as the total of the lower alkyl(meth)acrylate monomer (A3) and the N,N-dialkyl(meth)acrylamide monomer (A4). If the content of the lower alkyl(meth)acrylate monomer (A3) is less than 50 parts by mass, the curing time required to obtain a sufficient degree of crosslinking is longer because the copolymer is much more hydrophilic. On the other hand, if the content of the lower alkyl(meth)acrylate monomer (A3) exceeds 90 parts by mass, the effect of increasing the hydrophilicity of the copolymer is reduced, and the blushing suppression effect tends to be less.

[Method of Manufacturing Copolymer (A)]

Copolymer (A) can be obtained by copolymerizing a monomer mixture of the aforementioned monomers (A1), (A2) and (A3), together with monomer (A4) as necessary. The copolymer structure can be a random copolymer, alternating copolymer, block copolymer or graft copolymer structure, but a random copolymer is preferred from the standpoint of ease of preparation, and for improving the anti-fog properties and other effects of the anti-fog coating composition. A radical polymerization method, cationic polymerization method, anionic living polymerization method, cationic living polymerization method or other known polymerization method can be adopted as the polymerization method for obtaining the copolymer, but a radical polymerization method is preferred for ease of industrial production in particular, and for reasons of performance in every sense. A common bulk polymerization method, suspension polymerization method, emulsion polymerization method or the like can be adopted as the radical polymerization method, but a solution polymerization method is preferred because the composition can then be used as is as a coating material after polymerization.

A manufacturing method using solution polymerization is explained below.

If the polymerization solvent has a very high boiling point, the tight adhesion between the coating film and the substrate may be adversely affected by residual polymerization solvent remaining from drying and heat-curing of the coating film, so it is desirable to use a polymerization solvent with a boiling point of less than 180° C. Examples of such polymerization solvents include methanol, ethanol, n-propanol, isopropanol, n-butanol, isobutanol, s-butanol, t-butanol, diacetone alcohol and other alcohol solvents; ethylene glycol monomethyl ether, ethylene glycol monethyl ether, propylene glycol monomethyl ether, propylene glycol monoethyl ether, 3-methoxy-1-butanol, 3-methoxy-3-methyl-1-butanol and other alcohol ether solvents; acetone, methyl ethyl ketone, methyl isobutyl ketone, cyclohexanone and other ketone solvents; tetrahydrofuran, dioxane and other ether solvents; methyl acetate, ethyl acetate, n-butyl acetate, isobutyl acetate, t-butyl acetate, methyl lactate, ethyl lactate and other ester solvents; benzene, toluene, xylene and other aromatic solvents; formamide, dimethyl formamide and other amide solvents; and water and the like. One or two or more of these polymerization solvents may be used.

The total amount of the monomers is preferably 50 parts by mass or less per 100 parts by mass as the combined amount of the polymerization solvent used in the polymerization reaction plus the total amount of the monomers (A1), (A2) and (A3), and monomer (A4) as necessary. If the ratio of monomers is over 50 parts by mass, more polymerization heat is generated, and industrial manufacture tends to be difficult.

A commonly used organic peroxide, azo compound or the like can be used as a radical polymerization initiator. Examples of organic peroxides include benzoyl peroxide, 3,5,5-trimethyl hexanoyl peroxide, t-butylperoxy-2-hexanoato-, t-butyl peroxypivalate, t-hexyl peroxypivalate and the like. Examples of azo compounds include 2,2'-azobis isobutyronitrile, 2,2'-azobis-2-methylbutyronitrile and the like. The added amount of the radical polymerization initiator is preferably 0.01 to 5 parts by mass per total 100 parts mass of the monomers (A1), (A2) and (A3) with monomer (A4) as necessary. To control polymerization heat generation, it is desirable drip a radical polymerization initiator into the reaction container to perform the polymerization reaction. The polymerization temperature can be changed appropriately according to the kind of radical polymerization initiator used, but is preferably 30 to 150° C. or more preferably 40 to 100° C. for purposes of industrial manufacture.

[Basic Compound (B)]

Next, basic compound (B) is explained. This basic compound is a component that neutralizes part of the sulfonic acid groups in the monomer (A2). Neutralizing part of the sulfonic acid groups in the monomer (A2) with basic compound (B) serves to increase the hydrophilicity of the copolymer and enhance the blushing suppression effect, while also suppressing oxidation degradation of the coating film caused by sulfonic acid groups in high-temperature environments, thereby improving heat resistance.

Examples of the basic compound (B) include sodium hydroxide, calcium hydroxide, ammonia, methylamine, dimethylamine, trimethylamine, ethylamine, diethylamine, triethylamine, monoethanolamine, diethanolamine, triethanolamine, dimethylaminoethanol, diethylaminoethanol, aniline, α-naphthylamine, benzylamine, pyridine, 2,6-lutidine, imidazole and the like. One or two or more of these may be used as the basic compound (B).

To facilitate dissociation from sulfonic acid groups during heat-curing of the coating film and to prevent interference with the acid catalyst effect of the sulfonic acid groups, the base dissociation constant (hereunder abbreviated as pKb) of the basic compound (B) in an aqueous solution at 25° C. is preferably 3 to 14, or more preferably 4 to 14. Examples of such basic compounds (B) include ammonia (pKb=4.7), methylamine (pKb=3.5), dimethylamine (pKb=3.4), trimethylamine (pKb=3.2), ethylamine (pKb=3.5), diethylamine (pKb=3.4), triethylamine (pKb=3.2), monoethanolamine (pKb=4.5), diethanolamine (pKb=5.1), triethanolamine (pKb=6.2), dimethylaminoethanol (pKb=4.1), diethylaminoethanol (pKb=4.1), aniline (pKb=4.6), α-naphthylamine (pKb=10.1), benzylamine (pKb=4.6), pyridine (pKb=8.8), 2,6-lutidine (pKb=8.0), imidazole (pKb=7.1) and the like.

In order to achieve a greater suppression effect on oxidation degradation of the coating film caused by sulfonic acid groups under high-temperature conditions, basic compound (B) preferably has a boiling point of 130 to 1500° C. and low volatility in high-temperature environments, and more preferably has a boiling point of 150 to 1500° C. Examples of this basic compound (B) include sodium hydroxide (boiling point 1390° C.), calcium hydroxide (degrades at melting point 580° C.), monoethanolamine (boiling point 172° C.), diethanolamine (boiling point 217° C.), triethanolamine (boiling point 335° C.), dimethylaminoethanol (boiling point 144° C.), diethylaminoethanol (boiling point 163° C.), aniline (boiling point 184° C.), α-naphthylamine (boiling point 301° C.), benzylamine (boiling point 183° C.), 2,6-lutidine (boiling point 144° C.) and imidazole (boiling point 256° C.).

A compound having a pKb of 3 to 14 in an aqueous solution at 25° C. and a boiling point of 130 to 1500° C. is especially desirable as the basic compound (B). Examples of this basic compound (B) include monoethanolamine, diethanolamine, triethanolamine, dimethylaminoethanol, diethylaminoethanol, imidazole and the like.

A compound having a pKb of 4 to 14 at 25° C. and a boiling point of 150 to 1500° C. is most desirable as the basic compound (B). Examples of this basic compound (B) include monoethanolamine, diethanolamine, triethanolamine, diethylaminoethanol, imidazole and the like.

The content of the basic compound (B) is determined so that this basic compound (B) neutralizes part of the sulfonic acid groups of the monomer (A2), leaving the monomer (A2) with both sulfonic acid groups that improve the hydrophilicity and heat resistance of copolymer (A) and non-neutralized sulfonic acid groups that promote the condensation reaction of the monomer (A1). In an embodiment, the content of the basic compound (B) is 50 to 95 mol % or preferably 60 to 90 mol % of the sulfonic acid groups in the monomer (A2). If the content of the basic compound (B) is less than 50 mol %, the effect of improving the hydrophilicity and heat resistance of the copolymer is less. On the other hand, it is undesirable for the content of the basic compound (B) to exceed 95 mol % because the acid catalyst function of the sulfonic acid groups is reduced, and the low-temperature curing properties of the copolymer are greatly diminished.

The method of neutralizing the sulfonic acid groups of monomer (A2) with the basic compound (B) may be either a method of adding the basic compound (B) to a solution of the copolymer and a solvent, or a method of adding basic compound (B) together with the monomers when manufacturing the copolymer. Of these, the latter method is preferred because acidity is reduced when monomer (A2) is neutralized with basic compound (B), thereby providing good solubility in the polymerization solvent and reducing the likelihood of corrosion of the reaction container.

[Surfactant (C)]

The surfactant (C) is explained next. The surfactant (C) is a component that reduces the surface tension of the moisture adhering to the coating film surface, forming a water film on the coating film surface and thereby improving the anti-fog properties. The surfactant (C) may be any conventionally known surfactant, and examples include non-ionic surfactants, anionic surfactants, cationic surfactants, amphoteric surfactants and the like. Of these, it is desirable to include at least one or more anionic surfactants in order to achieve lasting effects.

Examples of non-ionic surfactants include polyoxyethylene lauryl alcohol, polyoxyethylene lauryl ether, polyoxyethylene oleyl ether and other polyoxyethylene higher alcohol ethers, polyoxyethylene octyl phenol, polyoxyethylene nonyl phenol and other polyoxyethylene alkyl aryl ethers, polyoxyethylene glycol monostearate and other polyoxyethylene acyl esters, polypropylene glycol ethylene oxide adduct, polyoxyethylene sorbitan monolaurate, polyoxyethylene sorbitan monostearate and other polyoxyethylene sorbitan fatty acid esters, and alkyl phosphate ester, polyoxyethylene alkyl ether phosphate ester and other phosphate esters, sugar esters and cellulose esters for example.

Examples of anionic surfactants include sodium oleate, potassium oleate and other fatty acid salts, sodium lauryl sulfate, ammonium lauryl sulfate and other higher alcohol sulfate esters, dodecylbenzene sodium sulfonate, sodium alkyl naphthalene sulfonate and other alkyl benzene sulfonic acid salts and alkyl naphthalene sulfonic acid salts, condensed formalin naphthalene sulfonate, dialkyl sulfosuccinate salts, dialkyl phosphate salts, sodium polyoxyethylene alkyl phenyl ether sulfate and other polyoxyethylene sulfate salts and the like for example.

Examples of cationic surfactants include ethanolamines, laurylamine acetate, triethanolamine monoformate, stearamide ethyl diethylamine acetate and other amine salts, lauryl trimethyl ammonium chloride, stearyl trimethyl ammonium chloride, dilauryl dimethyl ammonium chloride, distearyl dimethyl ammonium chloride, lauryl dimethyl benzyl ammonium chloride, stearyl dimethyl benzyl ammonium chloride and other quaternary ammonium salts and the like for example.

Examples of amphoteric surfactants include dimethyl alkyl lauryl betaine, dimethyl alkyl stearyl betaine and other fatty acid-based amphoteric surfactants, dimethyl alkyl sulfobetaine and other sulfonic acid-based amphoteric surfactants, and alkyl glycine and the like for example.

The content of these surfactants (C) is preferably 0.5 to 30 parts by mass or more preferably 1 to 20 parts by mass per 100 parts by mass of the copolymer. If the content of the surfactant (C) is less than 0.5 parts by mass, it is difficult to obtain long-lasting continuous anti-fog properties of the coating film. If it exceeds 30 parts by mass, on the other hand, the external appearance and tight adhesiveness of the coating film are diminished, and the water resistance of the coating film also tends to be less. The method of mixing the copolymer and the surfactant (C) may be a method of adding the surfactant (C) to a solution of the copolymer dissolved in a solvent, or a method of adding the surfactant (C) together with the monomers during manufacture of the copolymer.

[Other Components]

The essential components of the anti-fog coating composition are the copolymer (A), the basic compound (B) and the surfactant (C). Various commonly used additives such as leveling agents, anti-oxidants, UV absorbents, light stabilizers, curing catalysts and the like can also be compounded as other components in the anti-fog coating composition. These other components can be compounded in the commonly used amounts for each additive.

[Preparation of Anti-Fog Coating Composition]

The anti-fog coating composition is generally manufactured by adding a solvent to dissolve, disperse or dilute a solution of the copolymer obtained by copolymerization of the aforementioned monomers, with the aim of adjusting the viscosity for coating purposes. Because the tight adhesion between the coating film and the substrate may be adversely affected by residual solvent remaining from drying and heat-curing of the coating film if the solvent has an extremely high boiling point, the solvent added to the copolymer solution preferably has a boiling point of less than 180° C.

Examples of such solvents include methanol, ethanol, n-propanol, isopropanol, n-butanol, isobutanol, s-butanol, t-butanol, diacetone alcohol and other alcohol solvents; ethylene glycol monomethyl ether, ethylene glycol monethyl ether, propylene glycol monomethyl ether, propylene glycol monoethyl ether, 3-methoxy-1-butanol, 3-methoxy-3-methyl-1-butanol and other alcohol ether solvent; acetone, methyl ethyl ketone, methyl isobutyl ketone, cyclohexanone and other ketone solvents; tetrahydrofuran, dioxane and other ether solvents; methyl acetate, ethyl acetate, n-butyl acetate, isobutyl acetate, t-butyl acetate, methyl lactate, ethyl lactate and other ester solvents; benzene, toluene, xylene and other aromatic solvents; formamide, dimethyl formamide and other amide solvents; n-hexane, cyclohexane, n-heptane, n-octane, n-decane and other hydrocarbon solvents; and water and the like. One or two or more of these may be used as the solvent.

[Coated Article]

A coated article formed using this anti-fog coating composition is explained here. This coated article is formed by applying and drying the anti-fog coating composition on an object to be coated as the substrate, and then heat-curing for 5 to 60 minutes at 60 to 150° C. to thereby form a coating film on the surface of the object to be coated.

As the specific method of forming the coating film, the anti-fog coating composition is first applied to the object to be coated by an application method used with ordinary coating materials. The surface of the object to be coated is preferably first cleaned of adhering contaminants, degreased and washed before application with the aim of increasing the wetting properties of the anti-fog coating composition on the object to be coated and preventing repellence. Specific examples of this include dust removal with high-pressure air or ionized air, ultrasonic cleaning with an aqueous detergent solution or alcohol solvent, wiping with an alcohol solvent or the like, and UV or ozone cleaning and the like. Suitable application methods include dipping, flow coating, roll coating, bar coating, spray coating and the like.

After application, the coating film is dried by volatilizing the solvent for 0.5 to 5 minutes at a temperature of 20 to 50° C. Next, the coating film is formed by heat-curing for 5 to 60 minutes at a temperature of 60 to 150° C., or preferably for 10 to 40 minutes at a temperature of 70 to 130° C. During this process, the sulfonic acid groups of the monomer (A2) promote a dehydration condensation reaction or dealcoholization condensation reaction of the N-methylol groups or N-alkoxymethylol groups of the monomer (A1) in the copolymer, forming crosslinked structures in the copolymer. However, when the object to be coated is a synthetic resin material, it is necessary to set the curing temperature to a temperature at or below the thermal deformation temperature of the synthetic resin material.

The film thickness of the coating film formed on the object to be coated with the anti-fog coating composition is preferably 0.5 to 20 μm or more preferably 1 to 10 μm in order to obtain good anti-fog properties and a good external appearance of the coating film. If this coating film is thinner than 0.5 μm the anti-fog properties of the coating film tend to be less, while if it is thicker than 20 μm the external appearance of the coating film tends to be poor.

Films, plates and molded articles of acrylic resin, polycarbonate resin, polyethylene terephthalate resin and other transparent resins, and worked articles of these, can preferably be used for the object to be coated with the anti-fog coating composition. A vehicular lighting fixture is especially desirable as this object to be coated. Specific examples of vehicular lighting fixtures include headlights, auxiliary headlights, road lights, license-plate lights, tail lights, parking lights, brake lights, back-up lights, turn indicator lights, auxiliary turn indicator lights, hazard flashers and the like.

Summary of Effects of Embodiment (1) With the anti-fog coating composition of the embodiment, good curing properties are obtained due to the properties of the monomer (A1), while accelerated curing at low temperatures and blushing suppression are achieved due to the properties of the monomer (A2), and good heat resistance and adhesiveness with the substrate are achieved due to the properties of the monomer (A3). Moreover, neutralizing some of the sulfonic acid groups of the monomer (A2) based on the properties of the basic compound (B) serves to increase the hydrophilicity of the copolymer while at the same time enhancing the blushing suppression effect and providing excellent heat resistance by suppressing oxidation degradation of the coating film caused by sulfonic acid groups under high temperature conditions. Additionally, good anti-fog properties are achieved by the surfactant effect of the surfactant (C), which reduces the surface tension of the moisture adhering to the coating film surface so as to form a water film.

Thus, with the anti-fog coating composition blushing is suppressed even when the coating material is applied and dried under high-humidity conditions, and heat-curing can be achieved in a short time and at a low temperature to obtain a coating film with tight adhesion to a substrate and excellent heat resistance and anti-fog properties.

(2) Moreover, the monomer (A1) is set at 3 to 20 parts by mass, the monomer (A2) at 3 to 20 parts by mass and the monomer (A3) at 60 to 94 parts by mass, while the total of the monomer (A1) and the monomer (A2) is set at 6 to 40 parts by mass per 100 parts by mass as the total of the monomer (A1), the monomer (A2) and the monomer (A3). As a result, the curing properties based on the monomer (A1) are enhanced by the catalytic function based on the monomer (A2), while blushing during application can be suppressed by the hydrophilicity based on monomer the (A2). In addition, good heat resistance and adhesiveness of the coating film can be achieved because the content of the monomer (A3) is sufficient.

Moreover, the content of basic compound (B) is set at 50 to 95 mol % of the sulfonic acid groups in the monomer (A2). This increases the hydrophilicity of the copolymer to provide an adequate blushing suppression effect while maintaining the catalytic function of the sulfonic acid groups and improving heat resistance by suppressing oxidation degradation of the coating film caused by sulfonic acid groups under high-temperature conditions.

Because the content of the surfactant (C) is set at 0.5 to 30 parts by mass per 100 parts by mass of the copolymer (A), moreover, the surface tension of the moisture adhering to the surface of the coating film is reduced, and this effect is sufficient to form a water film.

(3) When the monomer mixtures also contains the N,N-dialkyl(meth)acrylamide monomer (A4), and the content of the monomer (A4) is set at 5 to 50 parts by mass per 100 parts by mass as the total of the monomer (A3) and the monomer (A4), the blushing suppression effect can be increased still further, and the heat resistance of the coating film can also be improved.

(4) Because the base dissociation constant pKb of the basic compound (B) in an aqueous solution at 25° C. is 3 to 14, the sulfonic acid groups and the basic compound are likely to dissociate during heat-curing of the coating film, allowing the sulfonic acid groups to fulfill their function as an acid catalyst.

(5) Because the boiling point of the basic compound (B) is 130 to 1500° C., it has low volatility under high-temperature conditions, making the effect of suppressing oxidation degradation of the coating film caused by sulfonic acid groups under high-temperature conditions more persistent, and further increasing heat resistance.

EXAMPLES

The aforementioned embodiment is explained in more detail below using examples and comparative examples.

Example 1

The following compounds were loaded into a reaction container equipped with an agitator, a nitrogen introduction pipe and a cooling pipe, and heated at 65° C. under a supply of nitrogen gas.

240 g of n-propanol (abbreviated as NPA below) as a polymerization solvent;

10 g of N-methylolacrylamide (abbreviated as N-MAA below) as the monomer (A1);

10 g of 2-acrylamido-2-methylpropanesulfonic acid (abbreviated as AMPS below) as themonomer (A2);

60 g of methyl methacrylate (abbreviated as MMA below) and 20 g of n-butyl acrylate (abbreviated as BA below) as the monomer (A3);

20 g of N,N-dimethylacrylamide (abbreviated as DMAA below) as the monomer (A4);

5.04 g of triethanolamine (see Table 1; boiling point 335° C., base dissociation constant pKb=6.2 in an aqueous solution at 25° C.) as the basic compound (B).

The amount of the basic compound (B) corresponds to 70 mol % of the sulfonic acid groups in the AMPS used as the monomer (A2). See formula: {AMPS loaded}/molar mass of AMPS×70%/100×{molar mass of triethanolamine}=10/207.4×70/100×149.2=5.04.

Next, a solution of 1 g of a hydrocarbon dilution of t-hexyl peroxide pivalate (Perhexyl PV™, manufactured by NOF Corp.) dissolved in 40 g of NPA was dripped into the reaction container over the course of 3 hours as the radical polymerization initiator. After 5 hours of polymerization, the temperature of the reaction solution was raised to 80° C., and polymerization was performed at that temperature for 1 hour to obtain a solution with a copolymer concentration of 30 mass %.

266.7 g of NPA and 400 g of propylene glycol monomethyl ether (abbreviated below as PGM) were added to 333.3 g of this copolymer solution (100 g as copolymer) to adjust the copolymer concentration to 10 mass %, and 10 g (8 g as pure product) of sodium di-2-ethylhexyl sulfosuccinate (Rapisol A-80™, NOF Corp., 80 mass % active ingredient) as the surfactant (C) and 0.1 g of polyether denatured polydimethyl siloxane as a leveling agent (BYK Chemical BYK333™) were mixed in to obtain an anti-fog coating composition.

This anti-fog coating composition was evaluated by the methods explained below for evaluating anti-fog coating compositions, with the results shown in Table 2.

TABLE 1

|  |  | Base dissociation constant (pKb) in an aqueous solution at 25° C. | Boiling point (° C.) | Molar mass (g/mol) |
|---|---|---|---|---|
| Basic compound (B) | Triethanolamine | 6.2 | 335 | 149.2 |
|  | Imidazole | 7.1 | 256 | 68.1 |
|  | Dimethylaminoethanol | 4.1 | 144 | 89.1 |
|  | Pyridine | 8.8 | 115 | 79.1 |
|  | Triethylamine | 3.2 | 90 | 101.2 |
|  | Sodium hydroxide | 0.2 | 1390 | 40.0 |

TABLE 2

|  |  |  | Units | Examples | | | | | | | |
|---|---|---|---|---|---|---|---|---|---|---|---|
|  |  |  |  | 1 | 2 | 3 | 4 | 5 | 6 | 7 | 8 |
| Monomers forming copolymer | A1 | N-MAA | Mass parts (total of monomers (A1) + (A2) + (A3) = 100) | 10 | 10 | 10 | 10 | 10 | 10 | 10 | 10 |
|  | A2 | AMPS |  | 10 | 10 | 10 | 10 | 10 | 10 | 10 | 10 |
|  | A3 | MMA |  | 60 | 60 | 60 | 60 | 60 | 60 | 60 | 60 |
|  |  | BA |  | 20 | 20 | 20 | 20 | 20 | 20 | 20 | 20 |
|  | A4 | DMAA |  | 20 | 20 | 20 | 20 | 20 | 20 | 20 | 20 |
| Basic compound | B | Triethanolamine | Mol % (of sulfonic acid groups in monomer (A2)) | 70 | — | — | — | — | — | 50 | 95 |
|  |  | Imidazole |  | — | 70 | — | — | — | — | — | — |
|  |  | Dimethylaminoethanol |  | — | — | 70 | — | — | — | — | — |
|  |  | Pyridine |  | — | — | — | 70 | — | — | — | — |

TABLE 2-continued

|  |  |  | Units | Examples | | | | | | | |
|---|---|---|---|---|---|---|---|---|---|---|---|
|  |  |  |  | 1 | 2 | 3 | 4 | 5 | 6 | 7 | 8 |
|  |  | Triethylamine |  | — | — | — | — | 70 | — | — | — |
|  |  | Sodium hydroxide |  | — | — | — | — | — | 70 | — | — |
| Surfactant | C | Rapisol A80 (as pure product) | Mass parts (total of monomers (A1) + (A2) + (A3) + (A4) = 100) | 8 | 8 | 8 | 8 | 8 | 8 | 8 | 8 |
| Other | | BYK333 | | 0.1 | 0.1 | 0.1 | 0.1 | 0.1 | 0.1 | 0.1 | 0.1 |
| Solvent | | NPA | | 500 | 500 | 500 | 500 | 500 | 500 | 500 | 500 |
|  | | PGM | | 400 | 400 | 400 | 400 | 400 | 400 | 400 | 400 |
| Evaluation results | | Anti-blushing properties | | ⊗ | ⊗ | ⊗ | ⊗ | ⊗ | ⊗ | ○ | ⊗ |
|  | | Necessary curing time (minutes) | | 10 | 10 | 10 | 10 | 20 | 40 | 10 | 40 |
|  | | Adhesiveness (PC) | | ⊗ | ⊗ | ⊗ | ⊗ | ⊗ | ⊗ | ⊗ | ⊗ |
|  | | Adhesiveness (PMMA) | | ⊗ | ⊗ | ⊗ | ⊗ | ⊗ | ⊗ | ⊗ | ⊗ |
|  | | Anti-fog properties | | ⊗ | ⊗ | ⊗ | ⊗ | ⊗ | ⊗ | ⊗ | ⊗ |
|  | | Heat resistance | | ⊗ | ⊗ | ○ | Δ | Δ | ⊗ | Δ | ⊗ |

(1) Evaluation of anti-blushing properties

In an environment set to 30° C., variable relative setting between RH 60% and RH 90%, the anti-fog coating composition was applied by spray coating to a polycarbonate plate to a thickness of 2 to 3 μm of the coating film after curing, then left as is in the same environment for 30 minutes after application. This was then heat-cured for 10 minutes at 80° C. to obtain a coating film test piece. Coating film test pieces were prepared by the aforementioned methods at various relative humidity RH levels between 60% and 90%. The external appearance of the coating film was observed visually, and the maximum relative humidity at which no whitening or other abnormalities were observed was determined and evaluated according to the following four-grade scale. A grade of x means that there were problems for actual use, Δ means that there were no problems for actual use, ○ means more desirable and ⊗ means most desirable.

⊗: Colorless transparent coating film obtained in environment set to 90% RH
○: Colorless transparent coating film obtained in environment set to 80% RH
Δ: Colorless transparent coating film obtained in environment set to 70% RH
x: Colorless transparent coating film obtained in environment set to 60% RH (2) Evaluation of necessary curing time The anti-fog coating composition was applied by spray coating to a polycarbonate plate to a thickness of 2 to 3 μm of the coating film after curing, dried for 1 minute at 30° C., and heat-cured at 80° C. for various times between 10 and 90 minutes to obtain coating film test pieces. The curing time was varied within the range of 10 minutes, 20 minutes, 40 minutes, 60 minutes and a maximum of 90 minutes, the resulting coating film was immersed for 240 hours in warm water at 40° C. and dried for 1 hour at room temperature, and the external appearance of the coating film was evaluated visually. The minimum curing time at which the external appearance of the coating film after warm water immersion was the same as before the test was given as the necessary curing time. A necessary curing time of 40 minutes or less was considered not a problem for actual use, while 20 minutes or less was considered more desirable and 10 minutes or less was extremely desirable.

(3) Evaluation of Coating Film Performance

The anti-fog coating composition was applied by spray coating to a polycarbonate resin plate and an acrylic resin plate to a thickness of 2 to 3 μm of the coating film after curing, dried for 1 minute at 30° C., and heat-cured at 80° C. for the necessary curing time to obtain a coating film test piece.

(Adhesiveness (PC))

On the coating film test piece formed on the polycarbonate resin (PC) plate, a region of the coating film 1 cm long by 1 cm wide was cut at 1 mm intervals to prepare 100 grid squares. Cellophane tape was affixed to the surface of the grid squares and rapidly peeled off, and external appearance was observed visually and evaluated according to the following four-grade scale. A grade of x means that there were problems for actual use, Δ means that there were no problems for actual use, ○ means more desirable and ⊗ means most desirable.

⊗: No peeling
○: Slight peeling at the intersections of the cuts
Δ: Partial peeling observed
x: Completely peeled (Adhesiveness (PMMA))

Adhesiveness was evaluated in the same way as adhesiveness (PC) above except that the resin plate was replaced with an acrylic resin (PMMA) plate.

(Anti-Fog Properties)

The coating film test piece formed on the polycarbonate resin plate or acrylic resin plate was set 5 cm above the water surface of a warm water bath maintained at 80° C. with the coating film surface of the test piece facing down, the coating film was continuously exposed to steam from the warm water bath, and 10 seconds after exposure the presence or absence of fog was evaluated visually according to the following five-grade scale. A grade of x or xx means that there were problems for actual use, Δ means that there were no problems for actual use, ○ means more desirable and ⊗ means most desirable.

⊗: No fog observed
○: Slight fog observed for a moment immediately after exposure to steam, but not thereafter
Δ: Slight fog observed, or no fog observed but coating film surface appeared damaged rather than smooth
x: Obvious fog observed
xx: Coating film turned white immediately after exposure to steam due to insufficient curing (Heat Resistance)

The coating film test piece formed on the polycarbonate resin plate was left for 240 hours in a 120° C. atmosphere, and then cooled for 1 hour at room temperature. After cooling the aforementioned anti-fog test was performed, and the piece was evaluated as described above.

Examples 2 to 8

Copolymer solutions were prepared as in Example 1 except that the type of the basic compound (B) and the added amount thereof per the sulfonic acid groups in monomer (A2) were changed as shown in Table 2, anti-fog coating compositions were manufactured, and each was evaluated with the results shown in Table 2. The physical properties of the basic compounds (B) used in each example are shown in Table 1.

Examples 9 to 17

Copolymer solutions were prepared as in Example 1 but with the components and compounded proportions shown in Table 3, anti-fog coating compositions were manufactured, and each was evaluated with the results shown in Table 3.

In Example 5, the basic compound (B) was triethylamine with a pKb of 3.2 and a boiling point of 90° C., and because the pKb of the basic compound (B) was lower than in Example 1, the necessary curing time was longer in Example 5 than in Example 1. Moreover, because the boiling point of the basic compound (B) was lower in Example 5 than in Example 1 the heat resistance was lower in Example 5 than in Example 1, but this was not a problem for actual use.

In Example 6, the basic compound (B) was sodium hydroxide with a pKb of 0.2 and a boiling point of 1390° C., and because the pKb of the basic compound (B) was lower than in Example 1, the necessary curing time was longer in Example 6 than in Example 1, but this was not a problem for actual use.

Because the amount of the triethanolamine used as the basic compound (B) was at the lower limit of the preferred range in Example 7, the anti-blushing properties of Example

TABLE 3

| | | | Units | Examples | | | | | | | | |
|---|---|---|---|---|---|---|---|---|---|---|---|---|
| | | | | 9 | 10 | 11 | 12 | 13 | 14 | 15 | 16 | 17 |
| Monomers forming copolymer | A1 | N-MAA | Mass parts (total of monomers (A1) + (A2) + (A3) = 100) | 3 | 20 | 12 | 10 | 3 | 20 | 10 | 10 | 10 |
| | A2 | AMPS | | 12 | 10 | 3 | 20 | 3 | 20 | 10 | 10 | 10 |
| | A3 | MMA | | 65 | 60 | 65 | 60 | 70 | 60 | — | 60 | 60 |
| | | 2-EHMA | | — | — | — | — | — | — | 60 | — | — |
| | | BA | | 20 | 10 | 20 | 10 | 24 | — | 20 | 20 | 20 |
| | A4 | DMAA | | 20 | 10 | 20 | 10 | 20 | 10 | 20 | 20 | 20 |
| Basic compound | B | Triethanolamine | Mol % (of sulfonic acid groups in monomer (A2)) | 70 | 90 | — | — | 70 | 90 | — | 70 | 70 |
| | | Imidazole | | — | — | 70 | 90 | — | — | 80 | — | — |
| Surfactant | C | Rapisol A80 (as pure product) | Mass parts (total of monomers (A1) + (A2) + (A3) + (A4) = 100) | 8 | 8 | 8 | 8 | 8 | 8 | 8 | 0.5 | 30 |
| Other | | BYK333 | | 0.1 | 0.1 | 0.1 | 0.1 | 0.1 | 0.1 | 0.1 | 0.1 | 0.1 |
| Solvent | | NPA | | 500 | 500 | 500 | 500 | 500 | 500 | 500 | 500 | 500 |
| | | PGM | | 400 | 400 | 400 | 400 | 400 | 400 | 400 | 400 | 400 |
| Evaluation results | | Anti-blushing properties | | ⊗ | ⊗ | Δ | ⊗ | Δ | ⊗ | Δ | ⊗ | ⊗ |
| | | Necessary curing time (minutes) | | 20 | 10 | 20 | 10 | 40 | 10 | 10 | 10 | 10 |
| | | Adhesiveness (PC) | | ⊗ | ⊗ | ⊗ | ○ | ⊗ | Δ | ⊗ | ⊗ | Δ |
| | | Adhesiveness (PMMA) | | ⊗ | ⊗ | ⊗ | Δ | ⊗ | Δ | ⊗ | ⊗ | Δ |
| | | Anti-fog propertiees | | ⊗ | Δ | ⊗ | ⊗ | ⊗ | Δ | ⊗ | Δ | ⊗ |
| | | Heat resistance | | ⊗ | Δ | ⊗ | Δ | ⊗ | Δ | ⊗ | Δ | ⊗ |

The symbols in Tables 2 and 3 have the following meanings.
N-MAA: N-methylolacrylamide
AMPS: 2-acrylamido-2-methylpropanesulfonic acid
MMA: Methyl methacrylate
2-EHMA: 2-ethylhexyl methacrylate
BA: n-butyl acrylate
DMAA: N,N-dimethylacrylamide
NPA: n-propanol
PGM: Propylene glycol monomethyl ether As shown in Table 2, in the anti-fog coating compositions of Examples 1 and 2 the basic compounds (B) were triethanolamine and imidazole having pKbs of 6.2 and 7.1 and boiling points of 335° C. and 256° C., respectively, and the composition of the copolymer and the contents of the components were within the more preferred range. As a result, the anti-fog coating compositions of Examples 1 and 2 had extremely good anti-blushing properties, could be heat-cured at a low temperature in a short amount of time, and had extremely good coating film performance.

In the anti-fog coating composition of Example 3, the pKb of the basic compound (B) was 4.1 and the boiling point of the dimethyl amino ethanol was 144° C., and because the boiling point of the basic compound (B) was lower than in Example 1, the anti-fog coating composition of Example 3 had slightly less heat resistance in comparison with Example 1.

In Example 4, the basic compound (B) was pyridine with a pKb of 8.8 and a boiling point of 115° C., and because the boiling point of the basic compound (B) was lower than in Example 1 the heat resistance was lower in Example 4 than in Example 1, but this was not a problem for actual use.

7 were slightly inferior to those of Example 1 and heat resistance was less, but this was not a problem for actual use.

Because the amount of the triethanolamine used as the basic compound (B) was at the upper limit of the preferred range in Example 8, the necessary curing time was longer in Example 8 than in Example 1, but this was not a problem for actual use.

As shown in Table 3, because the content the of monomer (A1) was at the lower limit of the preferred range in Example 9, the curing properties of the copolymer were reduced and the necessary curing time was slightly longer.

In Example 10, because the content of the monomer (A1) was at the upper limit of the preferred range, the crosslinking density of the copolymer was higher, detracting from the anti-fog properties of the coating film and reducing heat resistance, but this was not a problem for actual use.

In Example 11, because the content of the monomer (A2) was at the lower limit of the preferred range, the hydrophilicity and curing properties of the copolymer were reduced, the anti-blushing effect was less, and the necessary curing time was slightly longer, but this was not a problem for actual use.

In Example 12, because the content of monomer (A2) was at the upper limit of the preferred range, the polarity of the copolymer was increased and affinity between the coating film and the substrate was reduced, resulting in a loss of adhesiveness and reduced heat resistance, but this was not a problem for actual use.

In Example 13, because the total of the monomer (A1) and the monomer (A2) was at the lower limit of the preferred range, while the content of the monomer (A3) was at the upper limit of the preferred range, the hydrophilicity and curing properties of the copolymer were reduced, the anti-blushing effect was less and the necessary curing time was longer, but this was not a problem for actual use.

In Example 14, the total of the monomer (A1) and the monomer (A2) was at the upper limit of the preferred range while the content of the monomer (A3) was at the lower limit of the preferred range. Thus, the polarity of the copolymer was increased and affinity between the coating film and the substrate was reduced, resulting in a loss of adhesiveness and a reduced anti-fog effect, and the crosslinking density of the copolymer was also higher, detracting from the anti-fog properties of the coating film and reducing heat resistance, but this was not a problem for actual use.

In Example 15, the hydrophilicity of the copolymer and the anti-blushing properties were reduced because the MMA (with 1 carbon atom in the alkyl group of the alkyl ester) of Example 1 was replaced with 2-EHMA (with 8 carbon atoms in the alkyl group of the alkyl ester) as the monomer (A3), but this was not a problem for actual use.

In Example 16, because the content of surfactant (C) was at the lower limit of the preferred range, the ability to form a water film was less than in Example 1 and the anti-fog properties were reduced, but this was not a problem for actual use.

In Example 17, adhesiveness was less than in Example 1 because the content of the surfactant (C) was at the upper limit of the preferred range, but this was not a problem for actual use.

The invention claimed is:

1. An anti-fog coating composition comprising:
a copolymer (A) formed from a monomer mixture containing a monomer (A1), a monomer (A2) and a monomer (A3) shown below;
a basic compound (B); and
a surfactant (C),
wherein:
the monomer (A1) is a vinyl monomer having N-methylol group,
the monomer (A2) is a vinyl monomer having sulfonic acid group selected from the group consisting of 3-sulfopropyl(meth)acrylate, 2-sulfoethyl(meth)acrylate, 2-acrylamido-2-methylpropanesulfonic acid, and a combination thereof,
the monomer (A3) is an alkyl(meth)acrylate monomer in which the number of carbon atoms in the alkyl group is 1 to 4,
the content of the monomer (A1) is 3 to 20 parts by mass, the content of the monomer (A2) is 3 to 20 parts by mass, the content of the monomer (A3) is 60 to 94 parts by mass, and the total of the monomer (A1) and the monomer (A2) is 6 to 40 parts by mass per 100 parts by mass as the total of the monomer (A1), the monomer (A2) and the monomer (A3),
the content of the basic compound (B) is 50 to 95 mol % relative to 100 mol % of the sulfonic acid group in the monomer (A2), and
the content of the surfactant (C) is 0.5 to 30 parts by mass per 100 parts by mass of the copolymer (A),
a base dissociation constant of the basic compound (B) in an aqueous solution at 25° C. is 3 to 14, and
a boiling point of the basic compound (B) is 130° C. to 1500° C.

2. The anti-fog coating composition according to claim 1, wherein the monomer mixture further contains a N,N-dialkyl (meth)acrylamide monomer (A4), the content of the monomer (A4) being 5 to 50 parts by mass per 100 parts by mass as the total of the monomer (A3) and the monomer (A4).

3. The anti-fog coating composition according to claim 1, wherein the copolymer (A) has crosslinked structures formed by a condensation reaction of N-methylol group of the monomer (A1), and the content of the basic compound (B) is predetermined so that the monomer (A2), after neutralized by the basic compound (B), has neutralized sulfonic acid group that improves the hydrophilicity of the copolymer (A) and non-neutralized sulfonic acid group that promotes the condensation reaction of the monomer (A1).

* * * * *